A. A. HOLLE.
CONTROL OF AEROPLANES.
APPLICATION FILED AUG. 11, 1919.
1,438,242.
Patented Dec. 12, 1922.
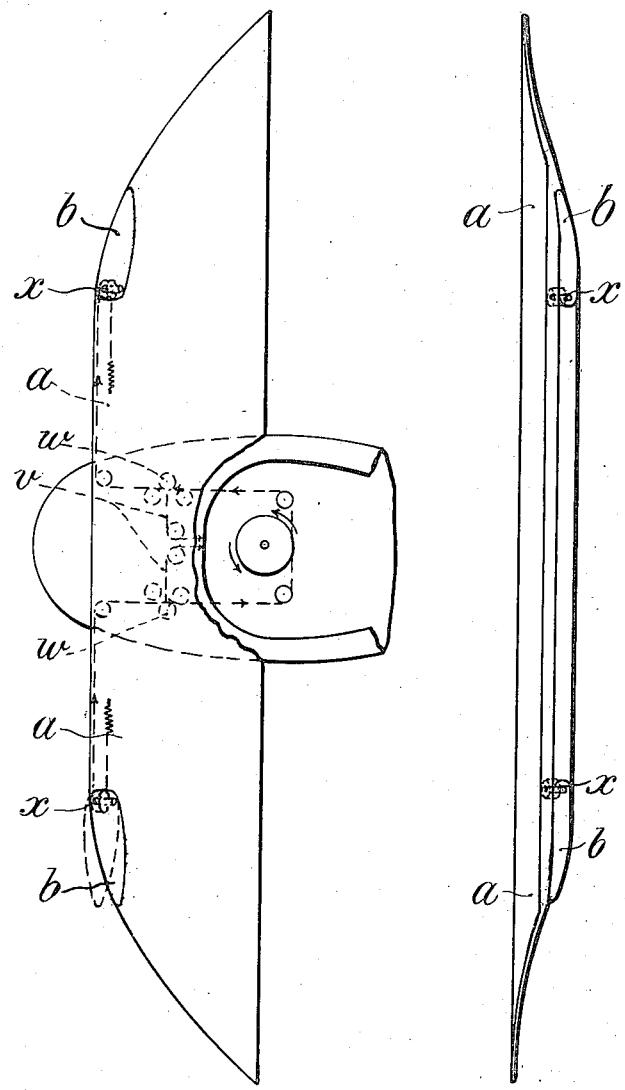
Fig. 1.   Fig. 2.
Fig. 3.
INVENTOR
A. A. Holle
per 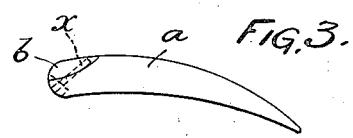
Attorney Patented Dec. 12, 1922.

1,438,242

UNITED STATES PATENT OFFICE.

ALEXANDER ALBERT HOLLE, OF LONDON, ENGLAND.

CONTROL OF AEROPLANES.

Application filed August 11, 1919. Serial No. 316,918.

*To all whom it may concern:*

Be it known that I, ALEXANDER ALBERT HOLLE, a subject of the Queen of the Netherlands, residing at 19, Half Moon Street, in the city of Westminster, administrative county of London, have invented certain new and useful Improvements in and Relating to the Control of Aeroplanes (for which I have obtained a patent in Great Britain May 14, 1918, No. 128341), of which the following is a specification.

This invention relates to the control of aeroplanes and has for its object obtaining both lateral and directional control by the movements of the wings or aerofoils alone.

A further object of this invention is while employing wings or aerofoils of the highest efficiency—which renders the gliding angle very flat—to increase the steepness of the gliding angle and at the same time reduce the air speed when required.

It is now well realized that to obtain the most efficient wing action the air flow must be entirely parallel to the direction of flight or two-dimensional—as it is called—which can only be attained by preventing the inflow of air above and the outflow of air below the wing surface at the lateral edges of the wings or aerofoils. So far as my present knowledge goes this two-dimensional air flow can only be attained by making the wings or aerofoils of a rectangular or approximately rectangular shape with their leading edges and trailing edges located in planes at right angles to the line of flight, by grading in plan each wing or aerofoil at its free side or lateral end so as to form a gradually reduced tip, and by suitably "washing-out" the curvatures and angles of incidence of the wings or aerofoils at their tips to suit the gradually reduced chord.

I attain the objects of my invention by the employment of wings or aerofoils constructed as aforesaid to give two-dimensional air flow, by the employment of means by which the flow of air above the wings or aerofoils can be so disturbed as to cause three-dimensional flow the effect of which is to increase the head resistance and at the same time decrease the lift, and by the employment of means for controlling the intensity of said disturbance or disturbances.

The means I employ to effect the required disturbance are small bastard wings which are pivoted in such a manner at suitable positions on the leading edge of each of the main wings or aerofoils that said bastard wings when in their normal or neutral positions form parts of the main wings or aerofoils and conform to the shape and outline thereof and when moved on their pivots move in an upward and forward direction thus effectively breaking the normal contour of the upper surfaces of the main wings or aerofoils without breaking or reducing the superficial area of said wings or aerofoils thus causing the desired disturbance of the flow of air above said wings or aerofoils.

In the accompanying drawing which is purely diagrammatic:—

Fig. 1 is a broken view in plan, and

Fig. 2 is a view in front elevation showing one of the bastard wings in its active or operative position and the other in its normal or inactive position.

In both views similar parts are marked with like letters of reference.

On the front edge of each of the main wings or aerofoils $a$—at a suitable distance from the tip—is a small bastard wing $b$ which in its normal or neutral position lies in a recess formed in the upper surface of the leading edge of said wing or aerofoil, and is pivoted by an inclined pivot to same at one end so that when said bastard wing is in its normal or neutral position as shown in the upper parts of Figs. 1 and 2, it conforms to the contour of the upper surface of the front edge of said wing or aerofoil, and when it is turned on its pivot to move it into its active position it moves in both a forward and upward direction as shown in the lower parts of Figs. 1 and 2, thereby breaks the contour of the upper surface of said wing or aerofoil without altering the superficial area of said wing or aerofoil and thus causes the desired disturbance of the flow of air above said wing or aerofoil.

The bastard wings are controlled to bring them into and out of their active positions by any suitable mechanism such for instance as the system of cables shown in Fig. 1, in which a single cable is employed to connect the controlling wheel or the like with both bastard wings the ends of said cable being anchored through suitable springs so that as one is brought into its active position the other is returned to and retained in its nonactive position. To enable both of the bastard wings to be simultaneously brought into their active positions auxiliary cables $v$ and displacement pulleys $w$ may be employed for contracting the effective lengths of the main cable between the controlling means and the two bastard wings.

As the use of these bastard wings has a tendency to cause undue spinning of the machine this may be overcome by the use of any suitable or known device already employed or suggested for counteracting spinning of an aeroplane.

When it is required to render the gliding angle steeper, for instance when landing in a confined space the two bastard wings are moved into their active positions at the same time, whereby the lift of both main wings or aerofoils is decreased and the resistance considerably increased thus allowing the gliding angle to become steeper and at the same time retarding the speed of the machine.

I claim:

1. In an aeroplane the combination with the main wing or aerofoil of bastard wings pivoted to the leading edge of said wing or aerofoil the pivots of said wings being so inclined that when said wings are moved out of their normal positions in which they conform to the contour of the main wing or aerofoil they move both forwards and upwards relative to the upper surfaces of the main wing or aerofoil, and means for moving said bastard wings from one position to the other either simultaneously or independently.

2. In an aeroplane the combination with an aerofoil constructed to give two-dimensional air-flow, of two bastard wings pivoted at the forward or leading edge of said aerofoil above the upper surface thereof so that they can either conform to the contour of the upper part of said aerofoil or be moved into a position both in front of and above said leading edge, of means for operating said bastard wings simultaneously so that as one is brought into its operative or active position the other is brought into its normal or inactive position, and of means for bringing both said bastard wings simultaneously into either position.

3. In an aeroplane the combination of an aerofoil the central part of which is of rectangular shape and the ends of which are graded in plan and have their angles of incidence "washed out," of two bastard wings pivoted at the forward or leading edge of said aerofoil above the upper surface thereof so that they can either conform to the contour of the upper part of said aerofoil or can be moved into a position in front of and above said leading edge, and of means for operating said bastard wings simultaneously so that as one is brought into its operative or active position the other is brought into its normal or inactive position.

4. In an aeroplane the combination of an aerofoil above the upper surface thereof the central part of which is of rectangular shape and the ends of which are graded in plan and have their angles of incidence "washed out," of two bastard wings pivoted at the forward or leading edge of said aerofoil so that they can either conform to the contour of the upper part of said aerofoil or can be shifted into a position above and in front of said leading edge, of means for operating said bastard wings simultaneously so that as one is brought into its operative or active position the other is brought into its normal or inactive position, and of means for bringing both said bastard wings simultaneously into either position.

ALEXANDER ALBERT HOLLE.